United States Patent [19]
Chilton et al.

[11] Patent Number: 5,361,799
[45] Date of Patent: Nov. 8, 1994

[54] WASTE WATER ACCESS FITTING

[76] Inventors: Jack L. Chilton, 17288 Earthwind, Dallas, Tex. 75248; C. Richard Braswell, 13829 Creeside Pl., Dallas, Tex. 75240

[21] Appl. No.: 243,171

[22] Filed: May 16, 1994

[51] Int. Cl.[5] .............................................. F16L 5/00
[52] U.S. Cl. ................................... 137/363; 137/797; 52/20; 52/245; 52/309.1
[58] Field of Search .................. 137/363, 364–373, 137/797; 52/20, 309.1, 245

[56] References Cited

U.S. PATENT DOCUMENTS

| | | | |
|---|---|---|---|
| 1,582,191 | 4/1926 | Sovooke | 137/363 |
| 3,715,958 | 2/1973 | Crawford et al. | 137/363 |
| 3,938,285 | 2/1976 | Gilbu | 52/20 |
| 3,974,599 | 8/1976 | Grosh | 52/20 |
| 4,089,139 | 5/1978 | Moffa | 52/20 |
| 4,239,056 | 12/1980 | Shope | 137/797 |
| 4,255,909 | 3/1981 | Söderström | 52/20 |
| 4,275,757 | 6/1981 | Singer | 137/363 |
| 4,957,389 | 9/1990 | Neatherg | 404/72 |
| 5,163,469 | 11/1992 | Trueb et al. | 137/370 |

Primary Examiner—A. Michael Chambers
Attorney, Agent, or Firm—John L. Palmer

[57] ABSTRACT

A watertight waste water access fitting that is placed below ground level to mate with a pipe from a waste water source and a pipe from a sewer system and with access to its inside from ground level. The fitting is a preformed, polyethylene, one piece hollow body with three formed extensions from the body. Two of the extensions are formed at the bottom sides of the fitting, and one is formed at the top. The bottom side extensions mate with water pipes, and the top extension can be opened to expose the inside of the fitting for maintenance. The bottom extensions are formed of connected segments of decreasing outer diameter with a cutting guide on each segment. The segments can be cut to mate with various diameters of pipe. The top segment has a cap and cutting guide where the cap can be removed by cutting the segment at the cutting guide. When the top segment is cut, the inner portion of the fitting is open for maintenance, or a standpipe extension can be inserted into the cut section if the fitting is placed below ground at a level where the cap is not readily accessible.

4 Claims, 4 Drawing Sheets

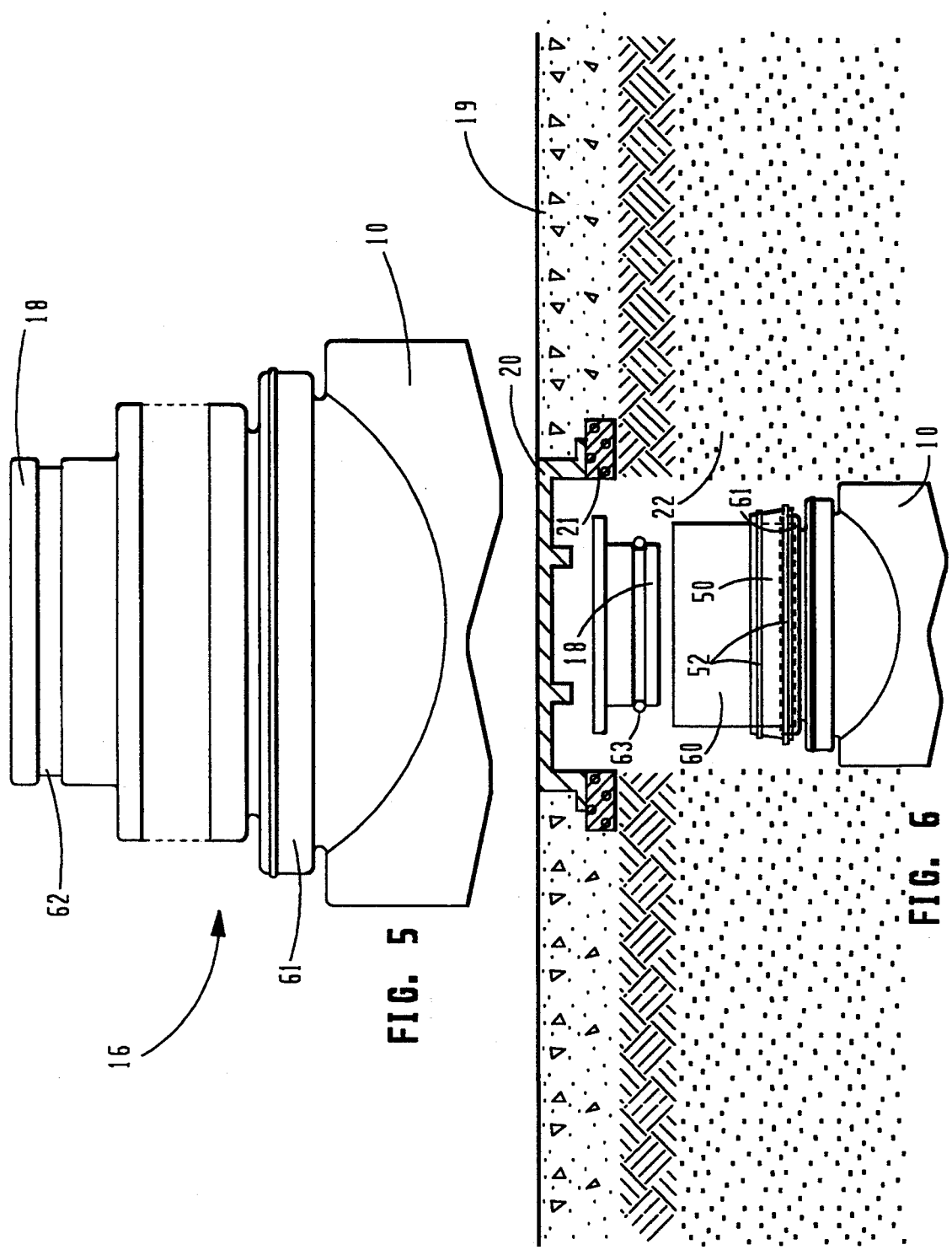

WASTE WATER ACCESS FITTING

FIELD OF THE INVENTION

This invention relates to a preformed, watertight, waste water fitting that is placed below ground to connect with and access waste water sources to a sanitary sewer system.

BACKGROUND OF THE INVENTION

Sanitary sewer systems generally include a series of manholes that are connected by sewer pipes to move waste water from sources to a sanitary treatment site. These manholes are most often constructed of concrete or block material and are conventionally shaped of cone, corbel, and bench sections. Such a manhole is shown in U.S. Pat. No. 4,957,389. Typically, the manholes are placed one thousand or more feet apart and are connected by the sewer pipes. They are four to five feet in diameter, and each is large enough to admit a maintenance worker into its interior. Additionally, a clean-out pipe is often connected to sewer pipes if the manholes are spaced unusually far apart. The clean-out pipe is connected to the sewer pipe and angled upward to ground level. The clean-out pipe can be opened at ground level to provide access to the sewer pipes for cleaning.

As described in U.S. Pat. No. 4,957,389, the manhole often requires a device installed in the manhole to catch water that flows into the manhole from ground level. The water can also flow in from many places, including cracks in the cone and corbel. The cracks are caused by shifts in the surrounding ground, temperature changes that affect the cement, and wear from auto traffic, and so forth. The cement of the manholes is also susceptible to disintegration from acids created in the sewer system.

Reinforced, preformed, plastic casings have been used to replace the concrete manholes. The plastic casings purportedly cost less and eliminate some of the problems found in the concrete manholes. For example, they are less affected by temperature changes, they generally do not crack, and they are impervious to acids in the sewer system. U.S. Pat. No. 3,938,285 discloses a two-piece, preformed, dome-shaped manhole casing that is to be placed below ground. It has cutouts at its bottom end that slip over sewer pipes that are in the line of the series of manhole locations. The size of the casings make them expensive to ship, and each casing may not match the requirements of the site terrain where it is to be installed. Additionally, the casing has to be sealed at the bottom to prevent leaks.

Other preformed casings have been suggested to overcome problems associated with installing a one piece, plastic manhole casing. The other suggested casings are segmented in various ways to be assembled and installed at the site. See for example U.S. Pat. Nos. 4,089,139, 4,255,909 and 4,275,75. These suggest preformed casings. While these casing are less expensive to ship, they are labor intensive at the installation site. They have a single input and output that are of standard size for sewer pipe in line at the sites.

The segmented and slotted casings are prone to leak and may float if installed in an area with a high water table. Most of these preformed casings are constructed of a cone, corbel, and bench in the manner of a concrete manhole. If the casing leaks, water may destroy the complete installation. Unless the casing is securely placed on a concrete foundation and surrounded by a fill material, a high water table can cause it to float and break the connections to input and output sewer pipes.

Consequently, it is not always economical to install a manhole of concrete or preformed plastic into which a maintenance worker can enter. Rather, a less expensive, more easily maintained waste water access fitting can be installed to access the waste water to the sanity sewer system. The fitting can be placed as the last or dead-end connection of the series of manholes, or it can be placed to access several homes in a cul-de-sac to the sanity sewer system. Additionally, the fitting can be placed between manholes to provide entry into the connecting sewer pipes for cleaning the sewer pipes more effectively than the smaller clean-out pipes that extend from ground level to the connecting sewer pipes.

The waste water access fitting can be made of preformed plastic, polyethylene, or a similar material. It is formed in a shape to be placed below ground to connect the waste water sources directly or indirectly to the sanitary sewer system. It is impervious to acids in the sewer system, and it need not be large enough for a person to enter into its body cavity for maintenance. However, it is large enough to admit equipment into its inner body for maintaining the connecting pipes, that is, equipment to clean out the pipes or admit TV cameras to inspect the pipes. It is watertight and may have waste water connections that receive water into its inner body from several sources and access the waste water to the sanitary sewer system through an output pipe. The waste water access fitting is placed below ground and held in position by granular fill dirt, and does not require a cement foundation as a mount. It is not a manhole. Rather, it supplements a manhole by accessing waste water to the sanitary sewer system.

Therefore, an object of my invention is to provide a waste water access fitting of a preformed, one-piece body that is smaller than a conventional manhole used in sewer systems. It is water tight and placed below ground with access to its inner body at ground level. It connects to waste water sources and a sanitary sewer to access the waste water to the sanitary sewer system while providing entry to its inner body from ground level for maintenance.

Another object of my invention is to provide a preformed, one piece, watertight waste water access fitting that is placed below ground to connect with sewer pipes in a series of manholes in a sanitary sewer system. The fitting is connected between manholes and has access from ground level to permit maintenance of the sewer pipes.

It is also an object of my invention to provide a preformed, watertight, one piece waste water access fitting that is placed below ground level to connect waste water sources to a sanity sewer system to accept and distribute waste water to the sanitary sewer system. The fitting is placed below ground and includes an extension that can be extended from the fitting to ground level to provide entry in its inner body from ground level

SUMMARY OF THE INVENTION

I have invented a waste water access fitting that is placed below ground to connect waste water sources to a sanitary sewer system. It connects with pipes from the wastewater sources and accesses the waste water through an output pipe to a sanitary sewer system. It is a preformed polyethylene, one piece, hollow body, preferably made of crosslinked, UV stabilized material that is resistant to stress crack. The body has a top extension that protrudes upward from the body. When the device is placed below ground, a cap on the top of the top extension is positioned just below ground level. The fitting has two or more additional extensions that are located on its lower, bottom sides. The lower extensions project laterally from the body, and each is comprised of a plurality of connected segments. Each connected segment has a smaller outer diameter than the outer diameter of a preceding segment. Each segment has a cutting guide at its end that separates that segment from a succeeding segment. Each segment can be cut at its cutting guide to mate that segment with a pipe to input or output waste water. When connected to an input or output pipe, the connection to the input or output pipes are sealed by a water tight rubber sleeve adapter. The top extension cap has a cutting guide that is located below the cap. The fitting is to be placed below ground at a level where the cap is easily reached from ground level. The top extension may be cut at the cutting guide to remove the cap to provide an opening into the inner body for maintenance of the connecting pipes.

At some sites, the waste water access fitting may be placed below ground at a depth at which the cap will not reach near ground level. At such an installation, the top extension is cut at the cutting guide to remove the cap, and a PVC standpipe is inserted into the opening of the fitting produced at the cut. The standpipe attachment to the body is made watertight by the same watertight rubber sleeve used with the lower side extensions. The standpipe extends to ground level and is cut at its top near ground level. The cap is inserted into the top of the standpipewith an "o" ring. The attachments at all connections and the cap in the standpipe produces a fitting that is completely watertight. The fitting distributes waste water and is accessible to its inner body from ground level for maintenance.

BRIEF DESCRIPTION OF THE DRAWINGS

FIG. 5 is a cutaway view of an upper segment of the fitting with cap removed.

FIG. 6 is a partial view of the fitting placed below ground level with a stand pipe attached to the top of the fitting that extends to ground level.

DETAILED DESCRIPTION OF THE DRAWINGS

Figure 1:
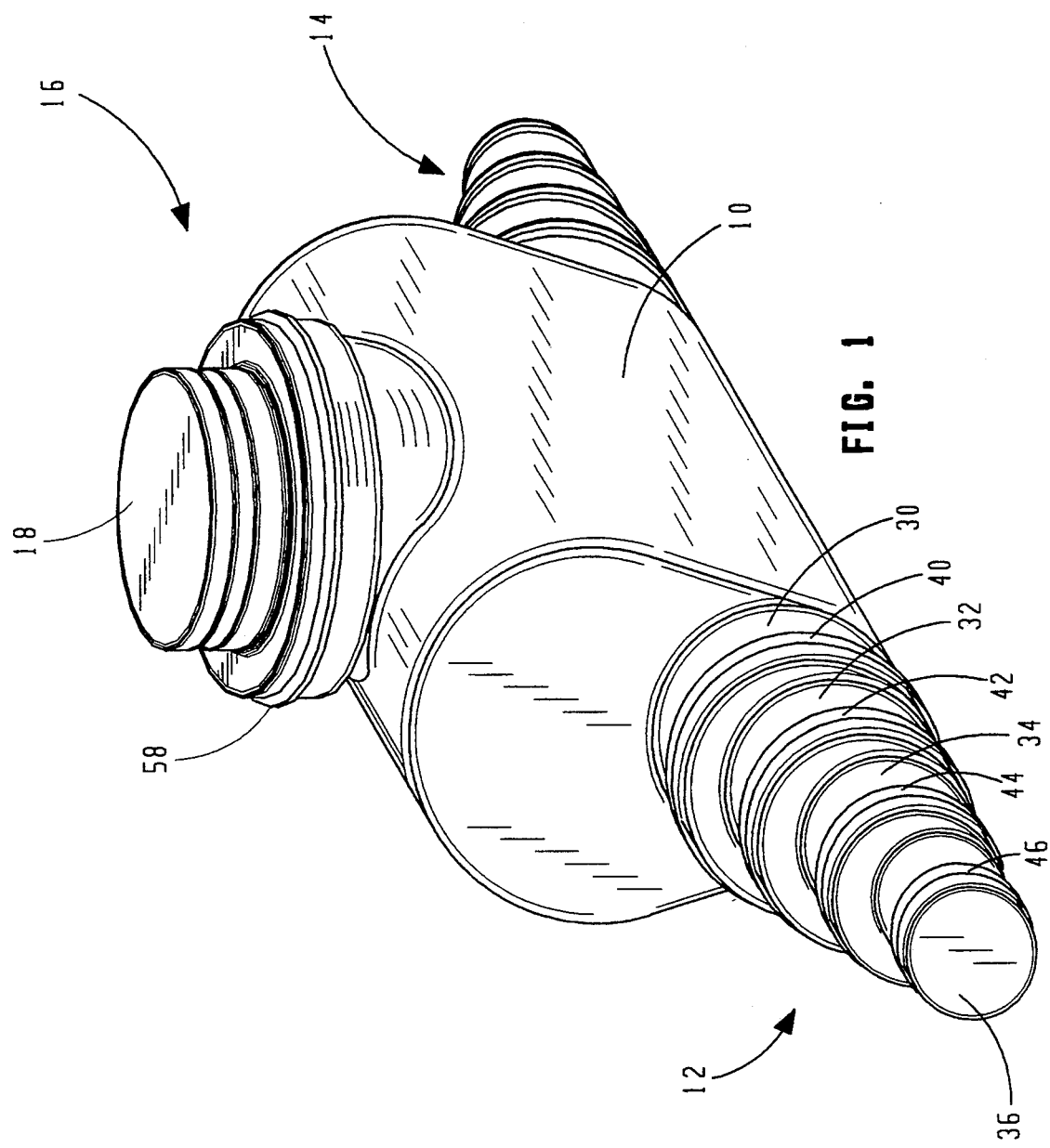
FIG. 1 is a perspective view of the waste water access fitting.

Refer first to FIG. 1. I show the waste water access fitting of my invention as a one piece body 10, which I prefer to be formed of polyethylene. I prefer the polyethylene be UV-stabilized, crosslinked HDPE powder, which will provide exceptional stress crack resistance when used to form the body 10. The body 10 may take a variety of shapes, the shape shown in FIG. 1 being one that may be used. The body 10 has formed extensions 12, 14, and 16 that extend therefrom. The extensions 12 and 14 are positioned at the bottom sides of the body 10 and the extension 6 is positioned on the top of the body 10. The extensions 12 and 14 accept or pass the waste water into and out of the body 10.

The sections 12 and 14 extend from the bottom sides of the body 10 to insure that no water will stand in the fitting. Manhole systems are installed in a line with sewer pipes connecting each succeeding manhole angled in the ground so that gravity feed of the waste water to the next manhole is insured. The fitting is also placed below ground so that gravity feed of the waste water will take place into and out of the fitting. Extension 16 protrudes upward from the top of the body 10. Its function is to project upward to ground level to provide an access into the body 10 from ground level, if needed. A cap 18 is formed on the top of the extension 16. The cap can be removed to provide an opening into the body 10.

Figure 2:
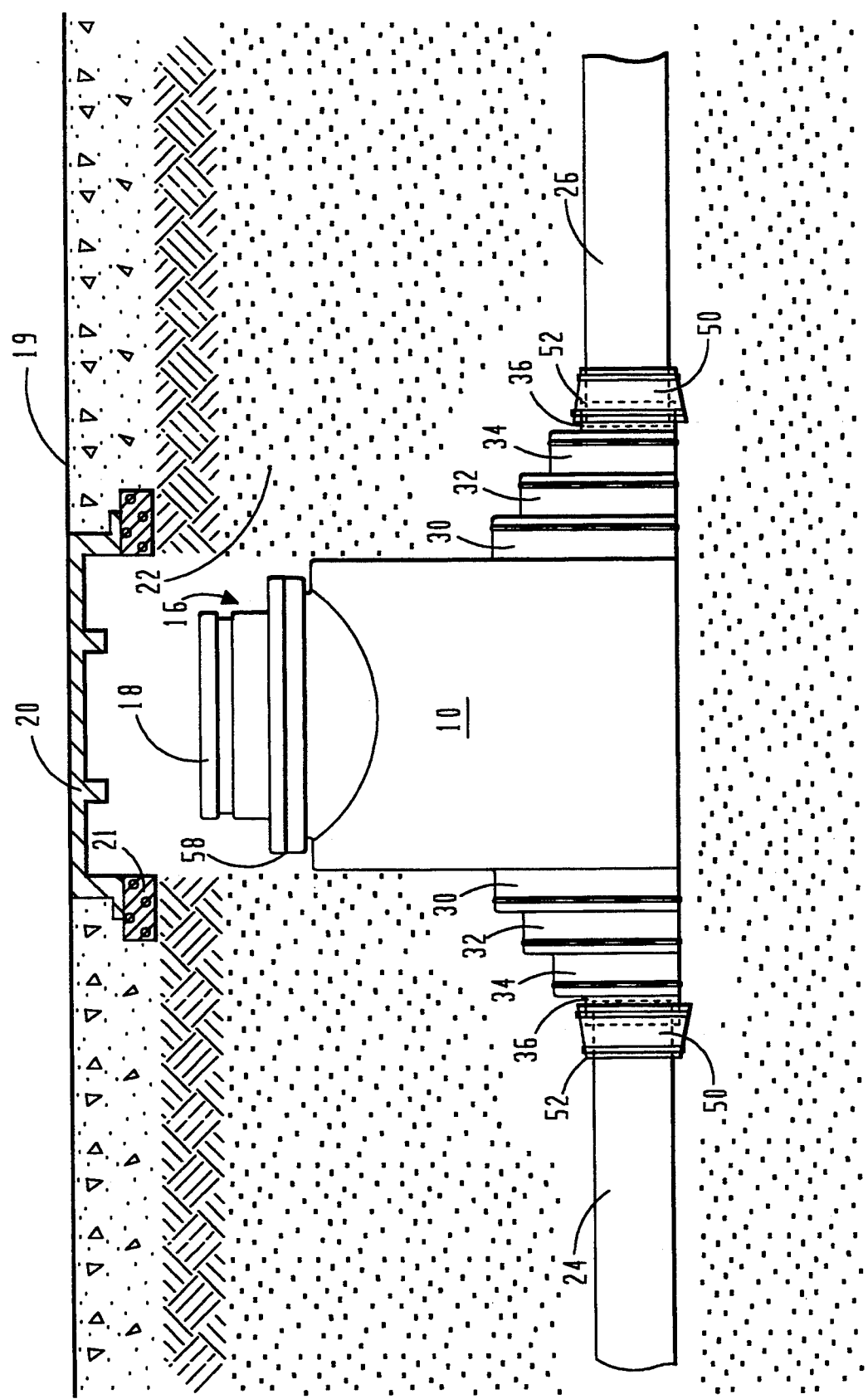
FIG. 2 is an elevation view of the waste water access fitting placed below ground level and connected to a waste water pipe and a pipe connected to a sewer system.

In FIG. 2, I show the waste water access fitting, as it can be placed below ground. When the fitting is placed below ground, I prefer that the cap 18 be located six to eight inches below ground level 19. When at that level below ground, I place a grate 20 at ground level 19 to cover the cap 18. The grate 20 can be held in place by a mount 21 that is placed beneath the ground level in granulated fill dirt 22. The fill dirt 22 also holds the fitting in position below ground. The grate 20 and mount 21 will not generally be subjected to unusual wear and tear because of heavy traffic over it, as it is not anticipated that the fitting will be placed in areas of very heavy traffic as are conventional manholes, that is city streets.

Pipes 24 and 26 connect to the waste water access fitting. One pipe is an input from a waste water source and the other pipe is an output that connects to a sanitary sewer system. The fitting is placed below ground with the pipes connected so that the pipes 24, 26 will move waste water into and out of the body 10 by force of gravity as is normal for manhole systems. The pipes 24, 26 are connected to the formed extensions 12 and 14 respectively. To facilitate connecting the pipes 24 and 26 to the fitting at various sites with different input or output pipe sizes, the extensions 12 and 14 are formed of a series of connected segments 30, 32, 34, and 36. Each of the segments 30, 32, 34, and 36 is of a different outer diameter. Segments 30 are the larger diameter of the connected segments, and they begin at the lower portion of the body 10. Succeeding segments 32, 34, and 36 have progressively smaller outer diameters than the segment 30.

One of the segments 30, 32, 34, or 36 will match the diameter of standard pipes 24, 26 that are used in most sanitary sewer systems. The sizes generally used in sewer systems are six, eight, ten and twelve inch pipe. For a particular pipe size, a selected matching diameter segment is connected to the pipe. FIG. 2 shows the pipe connected to the six-inch segment 36.

Figure 3:
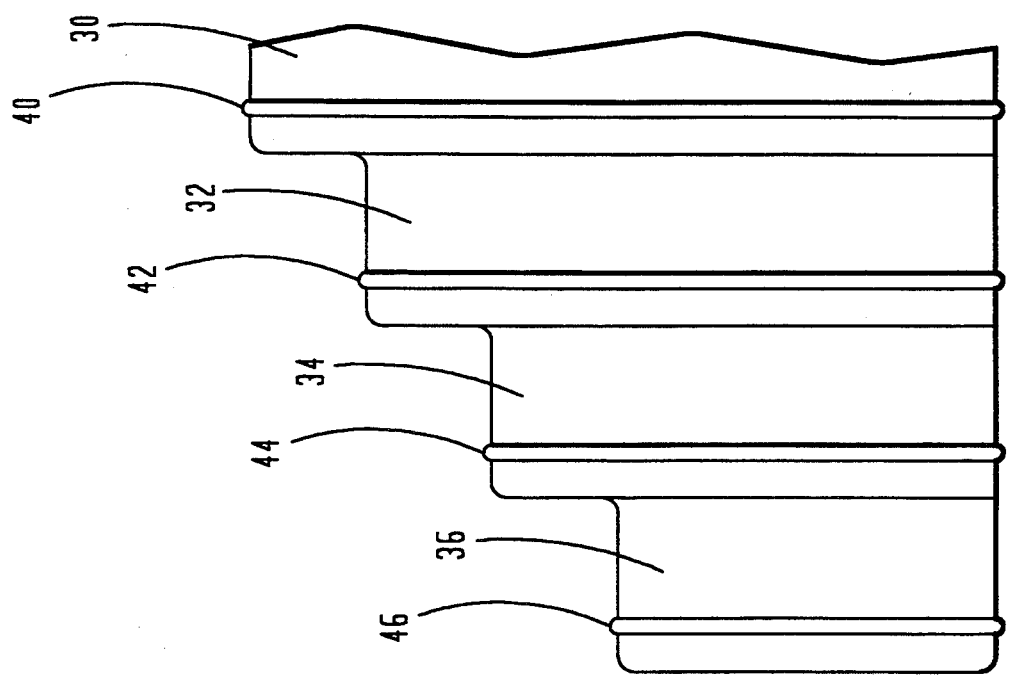
FIG. 3 is a partial elevation view of formed extensions at the lower body sides of the fitting that access waste water from sources to a sanitary sewer system.

I further show the shape of the connected segments in FIG. 3. In FIG. 3, I show that each of the segments 30, 32, 34 and 36 have cutting guides, 40, 42, 44, and 46 respectively, located at the end of its segment. Each connected segment is indented along its section at the cutting guides 40, 42 44, and 46, to mark the position at which that segment is to be cut to open that segment and thus the body 10 to connect to pipes 24 or 26. I use a water tight sealer to connect the pipes 24 and 26 to selected segments, that is, segment 36 as shown in FIG.

2, after the selected segments have been cut at their cutting guides.

Figure 4:
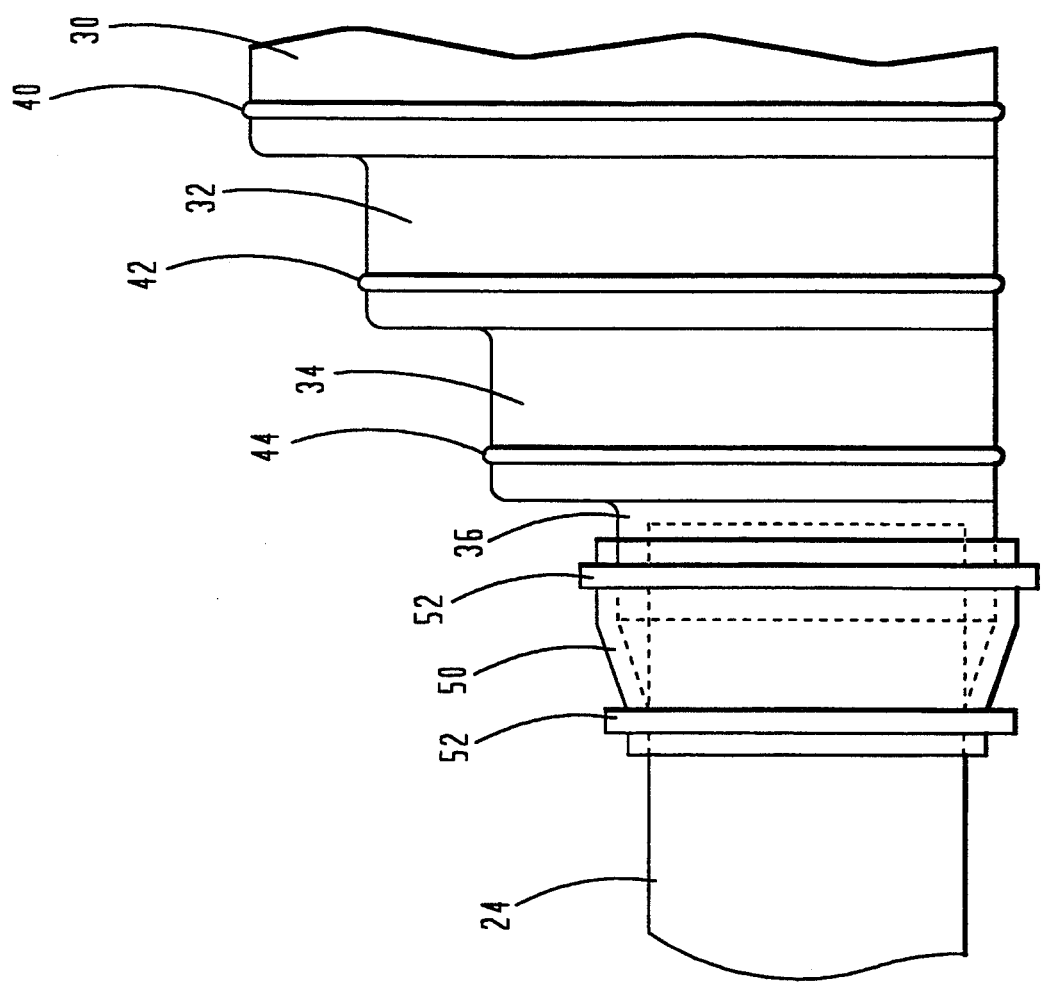
FIG. 4 is a partial view showing a watertight sleeve that connects the fitting to an input or output pipe.

In the cutaway view of FIG. 4, I show the water tight sealer as it connects a fitting segment and an input and output pipe. The water tight sealer is a hard rubber sleeve 50 that slides over a mated cut fitting segment and connecting pipe, thereby connecting the two. Stainless steel rings 52 are placed at each end of the sleeve 50. The stainless steel rings 52 can be tightened on the segment and pipe to form a water tight connection between the pipe and cut section. This rubber sleeve 50 provides rigidity of the connection and also gives the connection flexibility if the fitting should float because of a high water table at its location. The connection between the segment and pipe will not leak unless there is extreme shifting of the body 10 in the fill 22.

In FIG.5, I show the cap 18 removed from the top of the extension 16. This view shows that the top extension 16 is shaped different from that of extensions 12 and 14, and the cap 18 forms the top of the extension 16.

Briefly refer to FIG. 2. In FIG. 2, I show that the top of the cap 18 is positioned near ground level beneath the grate 20. Referring now to FIG. 5, I show the cap 18 severed at a cutting guide 58 that is placed on the extension 16. When the cap 18 is removed, the inside of the body 10 is opened. Maintenance can then be performed on pipes connected to the fitting.

A general installation of the fitting at a site can be as I show it in FIG. 2. However, some sites may require that the fitting be placed farther below ground than other sites and at a level at which the cap 18 may not reach just below ground level, as shown in FIG. 2. In that event, the cap 18 is removed at the cutting guide 58 and a PVC standpipe 60 is inserted into the opening made at the cutting guide 58. I prefer a standpipe of fifteen inch SDR sewer pipe that will firmly fit into the opening made at the cutting guide 58. An inner platform 61 is formed inside the extension 16. The standpipe 60 rests on the platform 61 when it is inserted into the opening. The standpipe 60 is then attached to the top of the extension 16 by rubber sleeve 50 and sealed watertight by stainless steel rings 52. The standpipe 60 extends to ground level and is cut off at its top at ground level. The cap 18, being smaller in diameter than the inner diameter of the standpipe 60, and having a grove 62 arround its perifery is inverted and inserted into the opening at top of the standpipe 60. An "o" ring 63 on in the grove 62 seals the cap 18 in the standpipe 60.

Modifications may be made to the embodiment of this invention without departing from the spirit thereof.

I claim:

1. A watertight, waste water access fitting that is placed below ground level to mate with a pipe from a waste water source and a pipe to a sanitary sewer system to access waste water from the source to the sewer system, comprising:

a preformed, polyethylene, one piece, hollow body having at least three formed sections that extend from said body, two of said formed sections positioned at the bottom sides of said body, and one positioned at the top of said body, one of the bottom formed sections mates with a pipe to receive waste water from the waste water and the other mates with a pipe to the sanitary sewer system;

each bottom-side section consists of a plurality of connected segments that begin at the bottom side of the body and extend outwardly therefrom, with each connected segment having an outer diameter that is smaller than its preceding segment;

a cutting guide located on each connected segment where a segment may be cut to mate with a waste water source pipe or a sanity sewer system pipe;

said top formed segment having a cap thereon;

a cutting guide below the cap at which point the cap may be severed to open the body of the fitting from the top, and means for forming watertight seals between said bottom side segments and pipes mated thereto.

2. The device of claim 1 in which said top segment is cut at said cutting guide to remove the cap and a standpipe is inserted into the opening of the cut section, said standpipe being adjustable in length to extend from said cut segment to ground level;

means for forming a watertight seal between said standpipe and said cut segment, and said severed polyethylene cap sealed in the top of said stand pipe in a watertight manner.

3. A watertight, waste water access fitting that is placed below ground to mate with a pipe from a waste water source and a pipe to a sanitary sewer system to access waste water to the sewer system, comprising:

a preformed, polyethylene, one piece, hollow body having three formed extensions positioned on the body with two extensions at the lower bottom and one at the top; each extensions consists of a plurality of connected segments that begin at the body and extend outwardly therefrom, with each connected segment having a diameter that is smaller than its preceding segment;

cutting guides located on each segment;

said top segment cut at its cutting guide to open the segment and a standpipe inserted into the opening of the cut segment, said standpipe being adjustable in length;

means for sealing the top of said standpipe in a watertight manner;

means for forming a watertight seal between said cut segments, pipe and standpipe.

4. A watertight, waste water aceess fitting that is placed below ground level to mate with pipes from waste water sources and a sanitary sewer system to access waste water to the sewer system, comprising:

a preformed, polyethylene, one piece, hollow body having two formed sections that extend from lower sides of said body, each section consisting of a plurality of connected segments with each segment having a smaller diameter than a preceding segment;

cutting guides on each segment where each segment can be cut to mate with a pipe;

means for forming a water tight seal between a cut segment and a pipe;

a standpipe connected to the top of the fitting;

means for connecting the standpipe to the fitting in a water tight manner, and means for sealing the top of the standpipe in a water tight manner.

* * * * *